A. ZIMPRICH.
RESILIENT WHEEL FOR VEHICLES.
APPLICATION FILED APR. 1, 1912.
1,050,197.
Patented Jan. 14, 1913.
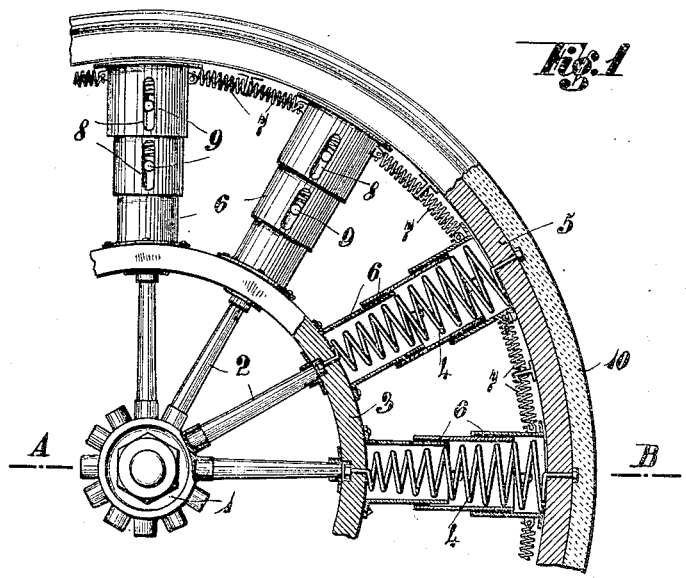
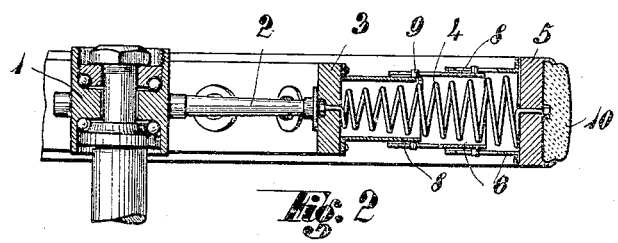
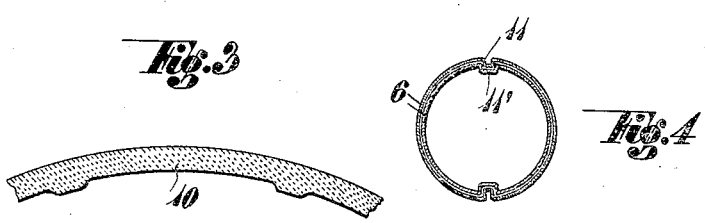
Witnesses:
A. Reynolds
E. Anderson.
Inventor:
Alois Zimprich
per
Lawrence Langner
Attorney.

UNITED STATES PATENT OFFICE.

ALOIS ZIMPRICH, OF OBERNDORF-PURGSTALL, AUSTRIA-HUNGARY.

RESILIENT WHEEL FOR VEHICLES.

1,050,197.  Specification of Letters Patent.  Patented Jan. 14, 1913.

Application filed April 1, 1912. Serial No. 687,665.

*To all whom it may concern:*

Be it known that I, ALOIS ZIMPRICH, a subject of the Emperor of Austria-Hungary, residing at Oberndorf-Purgstall, in the Empire of Austria-Hungary, have invented certain new and useful Improvements in Resilient Wheels for Vehicles, of which the following is a specification.

The present invention has for its object a resilient vehicle wheel characterized broadly by the fact that an inner wheel rim provided with spokes is connected with an outer rim arranged concentrically with the inner rim by helical springs arranged in telescopic sleeves and which are displaced radially when the wheel axle is loaded. Accordingly when the wheel axle is loaded by the weight of the vehicle or the like the lower helical springs are of course compressed while the upper springs are extended. When the wheel axle descends it will assume an eccentric position relatively to the outer tire and the springs located in telescopic sleeves and serving as spokes are able to adjust themselves in a radial direction in this position also.

The object of the invention is illustrated by way of example in the accompanying drawing, in which:—

Figure 1 shows a portion of a wheel in elevation and partial section. Fig. 2 is a section on the line A B in Fig. 1. Fig. 3 shows a portion of the india rubber tire, and, Fig. 4 illustrates a form of sleeve.

On the hub 1 which is preferably formed as a ball bearing, spokes 2 are arranged and are inclosed by a small wheel rim 3. In this rim, holes are provided in the direction of the spokes 2, the ends of the conically or cylindrically formed helical springs 4 engaging in these holes and being secured to the inner side of the wheel rim 3 by means of screw nuts. The outer larger tire 5 is also perforated in the direction of the spokes 2 and the other ends of the springs 4 are fixed in these perforations. As the said fixing of the ends of the springs would not be sufficient to prevent lateral displacement of the helical springs out of the plane of the spokes in the case of unequal loading each separate spring is inclosed in telescopically displaceable sleeves 6 which serve on the one hand to support the spring against a tendency to be bent out of the plane of the spokes and also to protect the springs from mud, dust or the like. The sleeves 6 are adapted to the form of the springs that is to say, they are made cylindrical or conical. The portion of the sleeve bearing on the smaller inner wheel rim 3 is firmly and immovably fixed thereto while the outermost portion of the sleeve resting on the inner periphery of the large wheel rim 5 is loose that is to say is not fixed and is only held in place by the springs 7. By this means it is possible that when the wheel axle descends the helical springs 4 located at the side are able to adjust themselves in the radial direction owing to their elasticity to the extent permitted of by the displacement of the sleeves and are therefore in a position to suspend the vehicle resiliently to the maximum extent. The inter-engaging sleeves are provided with slots 8 to secure them from axial rotation, a guide pin 9 on the next sleeve engaging in such slots.

Fig. 4 illustrates a modified form of sleeve in which the guides are formed in such a manner that a protuberance 11′ of one sleeve engages in a recess 11 in the next sleeve so that the sleeves are closed laterally and complete protection is afforded for the springs from dust or the like.

Fig. 3 shows a portion of the india rubber tire 10 which in order to increase its life is formed in such a manner that it is provided with protuberances at the places bearing on the helical springs fixed in the outer wheel rim or these protuberances can be replaced by the insertion of a protecting plate.

What I claim and desire to secure by Letters Patent of the United States is:—

A resilient wheel for vehicles comprising an outer rim and an inner rim, radially disposed spiral springs for connecting said rims together, telescopic members for housing said springs, pin and slot connections between the elements of said telescopic members, rigid connections between the inner elements of said telescopic members and the inner rim, and spring connections between the outer elements of said telescopic members and the outer rim.

In testimony whereof I affix my signature in presence of two witnesses.

ALOIS ZIMPRICH.

Witnesses:
 FRANZ ALFRED BERAN,
 ADA MARIA BERGER.

Copies of this patent may be obtained for five cents each, by addressing the "Commissioner of Patents, Washington, D. C."